United States Patent
Palanos et al.

[11] 3,750,670
[45] Aug. 7, 1973

[54] LASER CAUTERIZER

[75] Inventors: Paul N. Palanos; Fred C. Unterleitner, both of Palo Alto, Calif.

[73] Assignee: Medoptics, Inc., Palo Alto, Calif.

[22] Filed: Aug. 3, 1970

[21] Appl. No.: 60,492

[52] U.S. Cl................ 128/303.1, 128/395, 330/4.3, 331/94.5
[51] Int. Cl............................................ A61b 17/36
[58] Field of Search.................... 128/303.1, 395; 330/4, 4.3; 331/94, 94.5

[56]  References Cited
UNITED STATES PATENTS

| | | | |
|---|---|---|---|
| 3,456,651 | 7/1969 | Smart | 128/303.1 |
| 3,517,332 | 6/1970 | DeMaria | 331/94.5 |
| 2,929,922 | 3/1960 | Schawlow et al. | 128/395 UX |
| 3,504,300 | 3/1970 | Mazelsky et al. | 331/94.5 |

*Primary Examiner*—Lawrence W. Trapp
*Attorney*—Townsend and Townsend

[57] ABSTRACT

A laser with a light frequency transducer (typically of the frequency doubler type) within a lser cavity. The cavity is mirrored to reflect light at the lased frequency and to transmit light from the cavity at the transduced frequency. The laser is provided with a convex lens at its end adjacent the frequency transducer. Likewise, the cavity mirror adjacent the frequency transducer is provided with a concave reflecting surface. The convex lens in cooperation with the concave cavity mirror provides a necessary light pupil through the light frequency transducer for efficient frequency change and a collimated light path through the laser for efficient light emission. When utilized with a YAG laser and a silicon filter disposable into and out of the optic axis of the laser, a barium-sodium-niobate light frequency transducer can be heat tuned to provide a 6,600 angstrom lasing mode useful for repair of retinal detachment and a 5,320 angstrom mode useful for treating the retinal blood vessels of diabetics.

10 Claims, 4 Drawing Figures

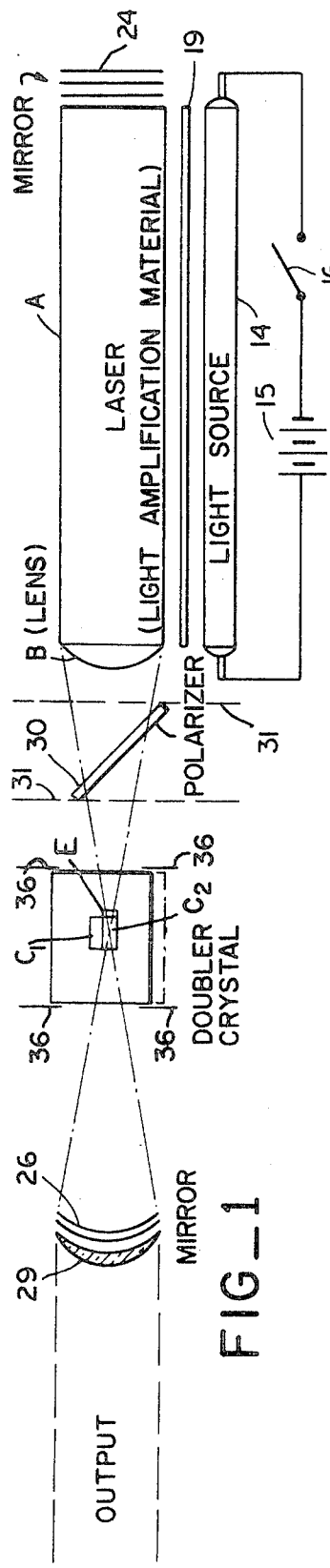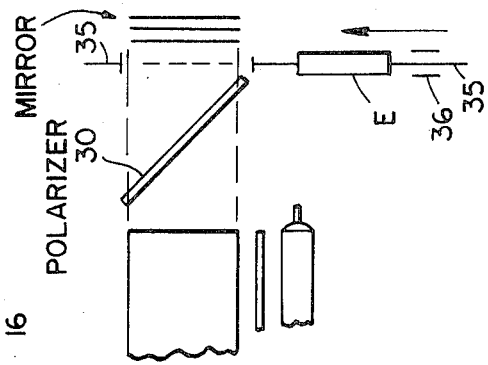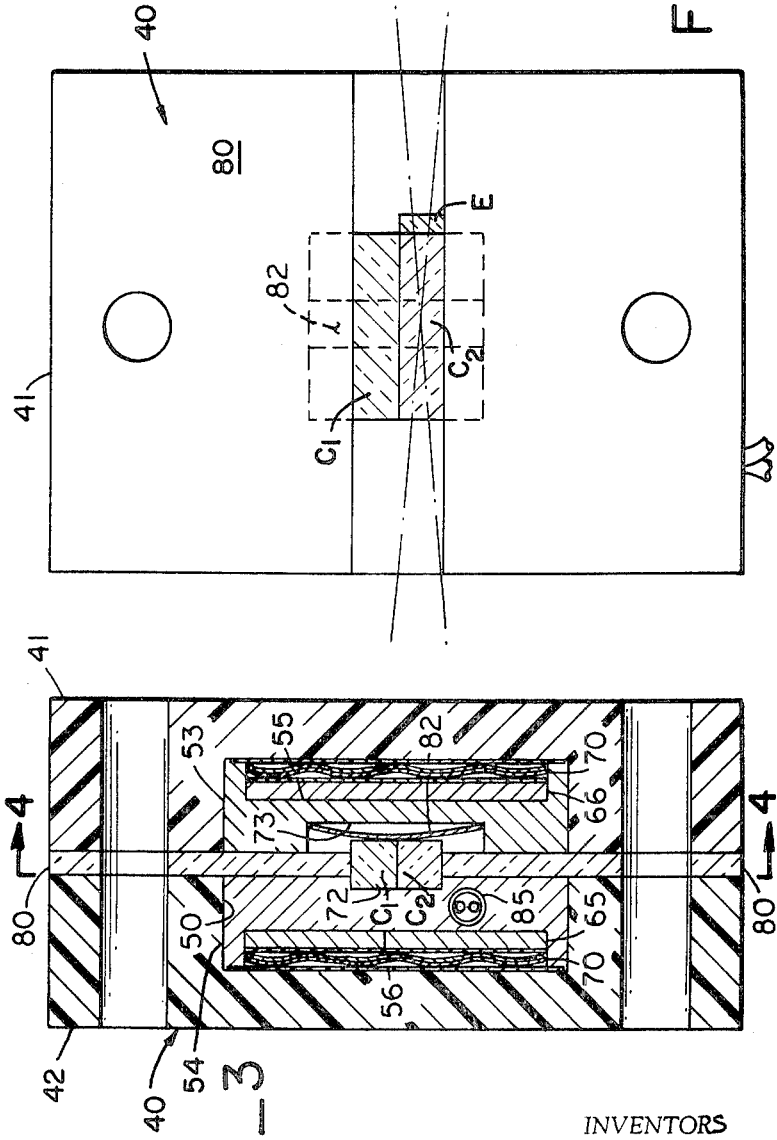
FIG_1
FIG_2
FIG_3
FIG_4
INVENTORS
PAUL N. PALANOS
BY FRED C. UNTERLEITNER
Townsend and Townsend
ATTORNEYS

3,750,670

LASER CAUTERIZER

This invention relates to a laser of the type wherein a light frequency transducer (typically a frequency doubler crystal) is disposed within the reflecting cavity around a laser and the laser is mirrored to reflect light energy emitted from the laser and to pass out of the lasing cavity light transduced by the doubler crystal.

Light transducers of the frequency doubler variety are frequently placed within a lasing cavity. This lasing cavity is typically mirrored at either end to feed back into the light circuit that light which is directly lased and to pass out of the cavity light which has been transduced by the frequency doubler crystal. Unfortunately, efficient operation of such light transducers or frequently doubler crystals requires that the crystal be located at a light pupil or maximum point of convergence in a focused light path.

Heretofore, light pupils necessary for operating a light transducer of the frequency doubler type have been provided in one of two ways. First, concave mirrors have been placed at either end of the laser cavity. These concave mirrors provide in the spatial interval therebetween a converging light path pupiled at the frequency doubler crystal. Unfortunately, in this type of laser cavity, the light path through the laser is also focused. With this focused light path, only a portion of the laser can be excited into the desired lasing mode, this portion typically being a frusto-conic section. Moreover, the angular light path through the laser gives rise to undesired chromatic and spherical aberrations.

To avoid the frusto-conic light path through the laser, other lasers have been provided with a lens between the laser and frequency doubler crystal. Thus, the light path from the lens through the laser to one of the mirrors is collimated and commonly excites the total section of the laser. Between the lens and other reflecting surface, the light path is focused into a convergent path having the light transducer placed at the pupil. Unfortunately, the placement of a conventional lens within a laser cavity introduces substantial inefficiencies. When the light passes into the lens and out of the lens, light energy is lost. Often this light loss is of such a magnitude that laser operation in lower light energy output lasing modes is fully prevented. Moreover, such lenses add to the total length of the laser cavity, often making the laser instruments unacceptably long.

An object of this invention is to provide an improved optic path in a laser cavity of the type having a frequency doubler crystal disposed therein. Accordingly, the laser end adjacent the frequency doubler crystal is provided with a convex lens surface integral with the laser. This convex lens surface provides a collimated light path through the laser allowing for maximum excitation of the laser. Between the laser and concave mirror at the other end of the laser cavity, a converging light path is provided wherein the frequency doubler crystal can be disposed at the light path pupil.

An advantage of this invention is that with the lens integral with and a part of the laser, the number of optically transparent surfaces through which the light must pass within the laser cavity is reduced by two and light energy conserved.

A further advantage of this construction is that a laser of the YAG type can be excited to lase continuously at the 1.32 micron mode within the laser cavity of this invention.

A still further advantage of the lens construction of this laser is that thermal focusing of the laser causes small displacement of the desired light path pupil.

Yet another advantage of this construction is that absent the requirement of a separate lens, the instrument into which the laser is incorporated can be made shorter.

A further object of this invention is to disclose a laser which can lase at a 6,600 angstrom mode for the repair of retinal detachments, and additionally can lase at a 5,320 angstrom mode for the treatment of retinal blood vessels of diabetics.

A still further object of this invention is to provide the YAG type laser with a combination silicon filter and frequency doubler crystal disposable into and out of the light path within the lasing cavity to tune the laser to its desired frequency.

An advantage of this filter and doubler crystal combination is that it does not require complex mechanical linkages to provide for angle tuning as in the case of a prism and further does not require precision angular adjustment.

An additional advantage of this filter is that medical personnel, unskilled in the laser art, can change the frequency of this laser system by simple manipulation of the filter.

A still further object of this invention is to provide a frequency doubler crystal which can be thermally tuned by a heater.

An advantage of thermal tuning of the frequency doubler crystal is that by the expedient of relatively simple thermostatically controlled electrical heaters, one of two heat tunings necessary for laser operation can be easily attained.

An advantage of the thermal tuning of the doubler crystal is that medical personnel, unskilled in the laser art, can heat tune the crystal without being required to make precision adjustments.

Other objects, features, and advantages of this invention will become more apparent after referring to the following specification and attached drawings to which:

FIG. 1 is a side elevation schematic of one embodiment of this invention;

FIG. 2 is a partial side elevation schematic of an alternate embodiment of this invention in which the filter and polarizer are disposed in the collimated light path between the laser and the flat refelcting mirror at the end of the cavity;

FIG. 3 is an expanded and elevation section of a heater apparatus used for heat tuning a frequency doubler crystal; and FIG. 4 is a side elevation of the heater apparatus illustrated in FIG. 3, showing the light pupil and frequency doubler crystal.

With reference to FIG. 1, xenon lamp 14 is shown electrically connected across power source 15 in series with electrical switch 16. Xenon lamp 14, when activated through closure of electrical switch 16, provides a relatively broad band excitation to laser A.

Interposed between laser A and xenon lamp 14 there is pyrex glass window 19. This window typically absorbs energy emitted by xenon lamp 14 below 3,000 angstroms to provide laser A with optimum exciting light.

Laser A is typically of the ytterium-aluminum-garnet crystalline variety in which a neodymium ion is the active light producing element. Commonly, such lasers are referred to as YAG lasers and that description will be adhered to in this specification.

As is understood in the art, the YAG laser illustrated is a 4 energy state laser wich receives a minimal amount of light energy before its active neodymium ions are placed in a state of population inversion. When the neodymium ions are in a state of population inversion, the laser will begin to emit lased light.

YAG lasers have three modes of emission of lased light energy. The first and predominant emission of lased light energy is in the range of 1.06 microns wavelength. Absent any tuning of the laser cavity, YAG lasers will always lase at this wavelength. Secondly, YAG lasers will emit light at 1.32 microns wavelength. This emission is secondary and requires that the dominant 1.06 micron lasing be suppressed. Additionally, it is possible to obtain a 9,460 angstrom wavelength emission from YAG lasers. The apparatus of this invention, however, does not provide for such excitation.

In its predominant lasing mode of 1.06 microns wavelength, the YAG laser of this invention when pulsed can tolerate a bleed off of 30 percent of the energy within the laser cavity without causing the light energy within the cavity to fall to a level below which lasing will no longer occur. When lased at 1.06 microns wavelength on a continuous wave basis (commonly referred to as CW) a bleed off of 5 to 6 percent of the energy produced within the cavity can be tolerated.

However, when the YAG laser is lased at 1.32 microns wavelength, the efficiency of the laser drops. In a pulsed mode, only 6 percent of the energy within the cavity can be bled off; in a CW mode of operation, only 1 percent of the energy within the cavity can be bled off. This low level of energy bleed off will require heat optic efficiency along the optic path within the cavity of the laser to maintain lasing at all. The convex lens B integrally attached to light amplification material A provides this efficiency.

Light amplification material A has integrally formed within the material thereof convex lens B at the end of the laser which is adjacent frequency doubler crystal C. Lens B is convex and has a focal point at the location of frequency doubler crystal C. Thus, it is seen that light energy emanating from light amplification material A is converging in path and has its smallest path section or pupil located within the frequency doubler crystal C.

It is important to note that lens B is integral and made out of the material of the laser. Thus, there is no optic interface between the laser and the lens.

The laser apparatus of this invention includes paired mirrors 24 and 26 at either end of the laser cavity. Mirror 24 is flat and attached directly to the end of light amplification material A so that its surface is normal to the optic axis. Mirror 26 is concave and separated by a preselected spatial interval from light amplification material A.

Generally, mirrors 24 and 26 are each composed of layered borosilicate glass substrates. Typically, this layered substrate is spaced to reflect light at 1.06 and 1.32 microns wavelength. When the light, however, impinges upon the mirrors 24 and 26 at 5,320 angstroms or 6,600 angstroms, the layered substrates no longer reflect. Rather, they permit the light to pass directly therethrough outside of the laser cavity.

Concave mirror 26 provides two distinct features. First, it has a radius of curvature preselected to retrodirect light in the 1.06 – 1.32 micron wavelength back along the focused path produced by lens B. Secondly, positive meniscus lens 29 is provided at the rear or exit side of the mirror 26. Lens 29 permits 5,320–6,600 angstrom light passing therethrough to be corrected from its divergent path and collimated. As collimated, light emanating from the laser through mirror 26 can pass downstream to further optics (not shown).

Frequency doubler crystals $C_1$ and $C_2$ are typically of the barium-sodium-niobate variety. These crystals have an anisoptropic effect on light. When light of a given polarity and frequency impinges on these crystals, the light is electromagnetically rotated 90° in phase and is doubled in frequency.

As here shown, two doubler crystals $C_1$ and $C_2$ are each placed in side by side relation. One doubler crystal $C_1$ is aligned for transducing light from the 1.06 micron wavelength to 5,320 angstroms wavelength. The doubler crystal $C_2$ is aligned for transducing light from the 1.32 micron wavelength to 6,600 angstroms wavelength.

In order to provide efficient operation of the frequency doubler crystals, it is necessary to polarize the light emanating from light amplification material A. This is done by placing Brewster angle plate 30 in the light path between the frequency doubler crystal and laser B. Typically, the Brewster angle plate will allow light of one polarity only to pass; light of the remaining polarities will be reflected out of the optic path along reflective paths 31 which are substantially normal to the optic axis of the lasing cavity.

As is well understood in the art, Brewster angle plate 30 must be disposed in angular relation to the barium-sodium-niobate frequency doubler crystals $C_1$ and $C_2$ used in the invention. As this alignment of the Brewster angle plate 30 and barium-sodium-niobate doubling crystal is well understood, it will not be set forth herein.

It is important that Brewster angle plate 30 must not be located in the light cavity between frequency doubler crystals $C_1$ and $C_2$ on one hand and the exit light path through mirror 26 on the other hand. This is because the frequency doubler crystals change the light polarity in a rotation of 90°. If the Brewster angle plate 30 was disposed between the frequency doubler crystals and the exit light path through mirror 26, it would tend to reflect the transduced light out of the optic path.

Filter E used with this invention is fabricated of silicon selected to pass light in the 1.32 micron wavelength. Light of other frequency ranges emanating from light amplification material A is blocked. Thus, it will be seen that when filter E is placed within the optic path, the predominant 1.06 micron mode of the laser is blocked and the secondary 1.32 micron wavelength light mode of the laser actuated.

Filter E is placed in the optic path of light through doubler crystal $C_2$. The filter in this location serves to block all light in passage through the crystal save for light in the range of 1.32 micron wavelength. Thus, frequency doubler crystal $C_2$ will only be exposed to light in the range of 1.32 micron wavelength and will only transduce this light to 6,600 angstroms wavelength.

Typically, the housing in which the two doubler crystals $C_1$ and $C_2$ are mounted is provided with slide mountings 36. These mountings 36, shown schematically in FIG. 1 permit the frequency doubler crystals $C_1$ and $C_2$ together with filter E mounted in the light path of crystal $C_2$ to be shifted or indexed along the light path from the laser. In one position doubler crystal $C_1$ will be in the light path. The laser will emit light in the range of 5,320 angstroms. In the other position doubler crystal $C_2$ and filter E will be mounted in the light path. The laser will emit light in the frequency of 6,600 angstroms.

One important limitation of the placement of filter E will be noted. As the filter will block all light in the range of 5,320 angstroms and 6,600 angstroms, it must be located between the frequency doubler crystal and laser rather than between the frequency doubler crystal and light exit path through mirror 26. If the filter were interposed in the latter location, all transduced frequencies of light from the frequency doubler crystal C would be blocked from exiting the laser.

Filter E when interposed in the light path of the laser of this invention has what may be described as two preferred locations. The first of these locations is illustrated in FIG. 1; the second of these locations is illustrated in FIG. 2.

Referring to FIG. 1, it is seen that filter E is disposed between laser B and frequency doubler crystal $C_2$ adjacent the frequency doubler crystal. In this location, filter E can be of relatively small size as the cross section of light passing through the filter is small. This placement of the filter additionally has the advantage of disposing the filter in a necessary spatial interval interior of the laser cavity. Hence, no necessary elongation of the laser cavity need occur when the filter is disposed at this location.

From an optic standpoint, it is preferred that the laser be interposed between planar mirror 24 and light amplification material A as shown in FIG. 2. In this location, outputs generated alternatively by the laser either in the 1.064 micron wavelength or the 1.32 micron wavelength are permitted to oscillate within the laser cavity between the light amplification material A and mirror 26 before being screened out by filter E. This latter effect permits the most efficient excitation of the laser. Unfortunately, such a placement of filter E between light amplification material A and mirror 24 commonly interferes with necessary electrical and cooling leads (not shown) communicated to the laser causes undesired instrument elongation. Moreover, in this location linkage is desirable to simultaneously shift filter E with frequency doubler crystal $C_2$.

Just as from an optic standpoint it is preferred that the filter be interposed between planar mirror 24 and light amplification material A, it is also preferred that Brewster angle plate 40 be interposed between planar mirror 24 and light amplification material A. This latter placement permits the most efficient excitation of the laser and is illustrated in FIG. 2.

The frequency doubler crystals of this invention can be heat tuned or angle tuned. Heat tuning is accomplished by a heater 40 disposed about the crystal. Typically, for doubling the light frequency from the range of 1.06 microns to 5,320 angstroms crystal $C_1$ must be maintained in one temperature range. Alternately, when light of the 1.32 micron frequency range is being doubled to 6,600 angstroms with crystal $C_2$, crystal $C_2$ must be maintained in a second temperature range. Heater 40 functions to accomplish this and is illustrated in FIGS. 3 and 4.

Heater 40 includes two outer casing members 41 and 42 each fabricated from a plastic material and defining in the interior thereof a hollow cavity 50 of rectangular configuration. Typically, the plastic material of casing members 41 and 42 is chosen to provide insulation to prevent the heat generated around the frequency doubler crystal from escaping.

Within cavity 50 there are two brass plates 42 and 54. Plates 53 and 54 at their sidewalls 55 and 56 adjacent the surfaces of members 41 and 42 are hollowed to receive two heater elements 65 and 66. The frequency doubler crystals $C_1$ and $C_2$ are disposed between these elements.

As can be seen in FIGS. 3 and 4, heater elements 65 and 66 are of rectangular cross section and extend the length of the frequency doubler crystal in brass plates 53 and 54. Heat generated in these elements is directly absorbed and transmitted through plates 53 and 54 to the frequency doubler crystals contained centrally and between the two plates.

To prevent escape of the heat generated between elements 65 and 66 through members 41 and 42 layers of aluminum foil insulation 70 are placed between the heating elements 65 and 66 and the members 41 and 42, respectively.

Frequency doubler crystals are positioned in a groove 72 in plate 54. This crystal extends from groove 72 into expanded groove 73 in plate 53. Between the plates 53 and 54 a slot is defined between casing members 41 and 42 by two pieces of electrical insulating material 80 clamped between the members. This slot is the optic path through frequency doubler crystals. $C_1$ and $C_2$ are placed in side by side relation.

Typically, leaf spring 82 within enlarged slot 83 is provided to bias the frequency doubler crystals into groove 72 and thus to maintain it rigidly on the optic axis of the laser. As the heater will be subject to wide temperature variation, spring 82 serves to accurately position the crystals in the presence of thermal expansion and contraction.

Control of the heat within the doubling crystals provided by a thermistor 85. This thermistor detects the temperature immediately adjacent the doubling crystal and is communicated through electrical circuitry (not shown) so that it will regulate the current supplied to, and hence the heat output of, heater elements 65 and 66. Typically, the thermistor and heater elements are electrically interconnected to maintain the frequency doubler crystal in one of two heat tuned states.

It should be appreciated that although heat tuning of the frequency doubler crystal is preferred because of its simplicity, the frequency doubler crystal can additionally be angle tuned. While such angle tuning will require precise instrument adjustment, problems of crystal deterioration due to operation of the crystal for prolonged periods at relatively high heats will be avoided.

While one embodiment of the invention has been shown and described, it will be obvious that other adaptations and modifications can be made without departing from the true spirit and scope of the invention.

What is claimed is:

1. In combination: a light amplification material disposed to emanate amplified light in a first frequency range along a preselected optical axis; means for defining a reflecting cavity disposed along said optic axis including a first reflecting means at one end of said cavity and a second reflecting means at the other end of said cavity with said light amplification material between; said first reflecting means adapted to reflect a first frequency range of light passing along said optic axis and to transmit therethrough a second frequency range of light passing along said optic axis; a light frequency transducer disposed in said reflecting cavity on said optic axis between said first reflecting means and said light amplification material for receiving light from said light amplification material in said first frequency range and transducing said light to said second frequency range; and means for pupiling said light at said light frequency transducer including a lens surface integral with and adjacent said light amplification material for converging light leaving said material along said optic axis to a pupil within said light frequency transducer.

2. The combination of claim 1 and wherein said one of said reflecting means is adapted to reflect light emanated by said light amplification material and to transmit light of increased frequency transduced by said light frequency transducer.

3. The combination of claim 1 and wherein said one of said reflecting means is provided with a concave reflecting mirror for retro-directing light to said light frequency transducer and laser along said convergent and pupiled light path.

4. In combination: a light amplification material having a first dominant light wavelength output and at least one second subordinate light wavelength output; means for exciting said light amplification material to emit amplified light; said light amplification material disposed to emanate said light wavelengths along an optical axis; means for defining a reflecting cavity on said optic axis with said light amplification material therebetween including first and second reflecting means on said optic axis with said light amplification material therebetween, said first reflecting means including means for retrodirecting a first frequency range of light emanated from said light amplification material along said optic axis and transmitting therethrough a second frequency range of light from siad optic axis; a light frequency transducer disposed between said first reflecting means and said light amplification material on said optic axis for receiving light from said light amplification material in said first frequency range and transducing said light to said second frequency range; a filter for disposition between said light frequency transducer and said second reflecting means optically selected to pass light of said subordinate wavelength output only; and, means for selectively moving said filter into and out of said optical axis whereby said light amplification material is excited to emit said first dominant light wavelength output with said filter out of said optic axis and excited to emit a second subordinate light wavelength output when said filter is in said optic axis.

5. In combination: a light amplification material having a first dominant light wavelength output and at least one second subordinate light wavelength output, said outputs all within a first preselected range; means for exciting said light amplification material to emit light by stimulated emission along a preselected optic axis; first and second mirror means disposed on both sides of said light amplification material on said optic axis for retro-directing light emanating from said light amplification material in said first preselected frequency range; a frequency doubler crystal disposed on said optic axis between said first reflecting means and said light amplification material for transducing light passing along said optic axis to a second preselected frequency range; said first reflecting means including light output means for passing light of said second preselected frequency range; means for passing one subordinate light wavelength output only; means for moving said passing means into and out of a disposition on said optic axis between said second mirror means and said frequency doubler crystal.

6. The combination of claim 5 and wherein said moving means disposes said passing means into and out of a disposition on said optic axis between said light amplification material and said second reflecting means.

7. The combination of claim 5 and wherein said moving means disposes said passing means into and out of a disposition on said optic axis between said ight amplification material and said frequency doubler crystal.

8. A laser cauterizer comprising: a YAG-Neodymium light amplification crystal disposed to emit amplified light by stimulated emission radiation along a preselected optical axis; means for defining a reflecting cavity on said optic axis with said light amplification crystal therewithin including first and second reflecting means on said optic axis for retro-directing light emanated by said amplification crystal; a frequency doubler crystal disposed on said optic axis between said first refelcting means and said light amplification crystal for doubling the frequency of said amplified light emitted by said YAG light amplification crystal; said first reflecting means adapted to pass light of said doubled frequency; a light polarizer mounted in phase relation with said frequency doubler crystal and disposed on said optic axis between said frequency doubler crystal and said second reflecting means; a silicon filter for passing light in the range of 1.32 microns wavelength; means for moving said filter into and out of said optic axis between said frequency doubler crystal and second reflecting means; means for providing a light path pupiled at said frequency doubler crystal including a convex means surface integral with said YAG light amplification crystal and a concave reflecting surface integral with said first reflecting means; and means for tuning said frequency doubler crystal to correspond to the amplified light emission of said YAG light amplification crystal along said optic axis.

9. The combination according to claim 4 and including a frequency doubler crystal, means mounting said frequency doubler crystal to said filter for movement into and out of said optic axes.

10. The combination according to claim 9 and including first and second doubler crystals; means for mounting said filter to one of said doubler crystals.

* * * * *